No. 833,204. PATENTED OCT. 16, 1906.
L. H. CRAWFORD.
DENTAL BITE TAKER.
APPLICATION FILED MAR. 3, 1906.
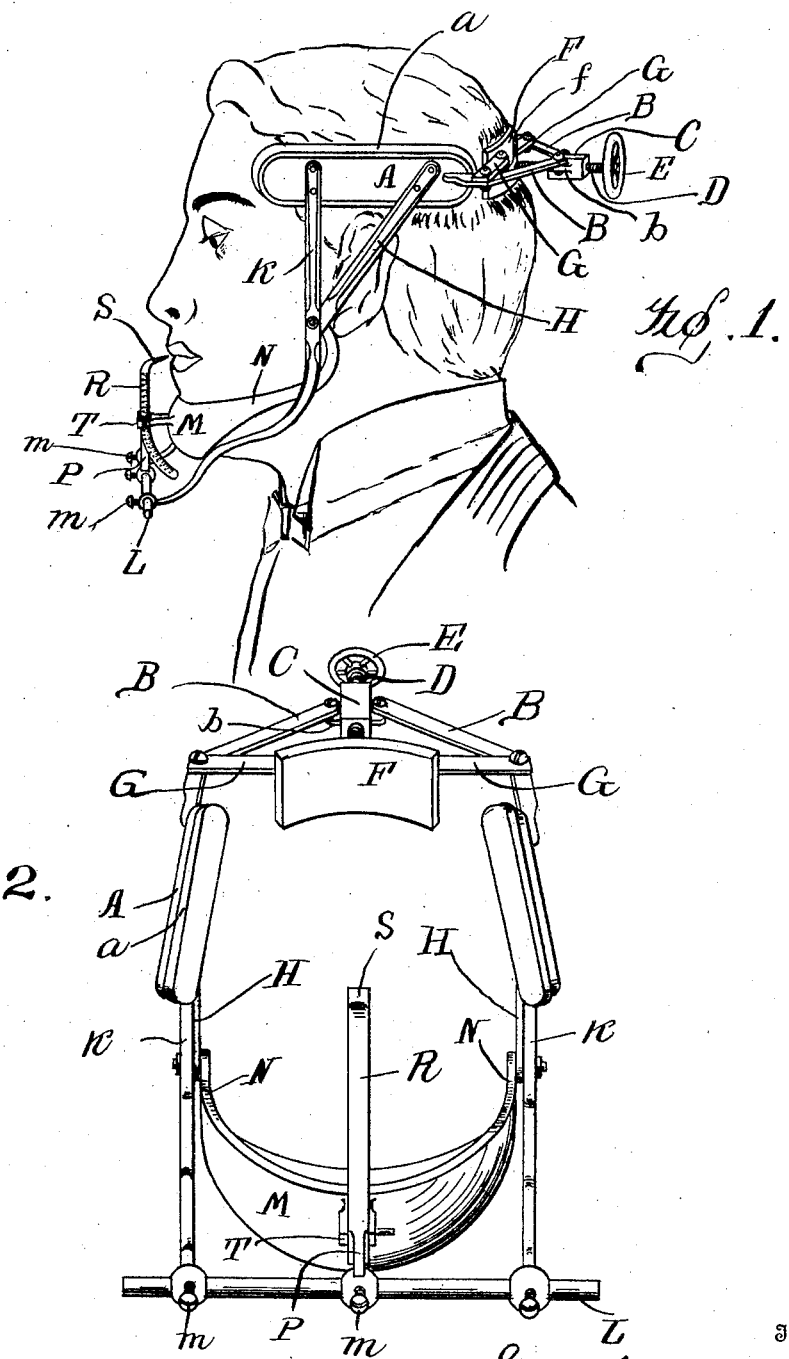

UNITED STATES PATENT OFFICE.

LYTER H. CRAWFORD, OF NEW YORK, N. Y.

DENTAL BITE-TAKER.

No. 833,204.  Specification of Letters Patent.  Patented Oct. 16, 1906.

Application filed March 3, 1906. Serial No. 303,992.

*To all whom it may concern:*

Be it known that I, LYTER H. CRAWFORD, a citizen of the United States, residing at New York, in the county of New York and State of New York, have invented certain new and useful Improvements in Dental Bite-Takers; and I do declare the following to be a full, clear, and exact description of the invention, such as will enable others skilled in the art to which it appertains to make and use the same.

This invention relates generally to dental apparatus, and particularly to an appliance or device for forcing a proper natural occlusion of and registering scientifically by scale the exact position of the human jaws necessary in taking the bite preparatory to preparing an artificial denture of any kind for the purpose of replacing the natural teeth in their different functions.

It performs mechanically, correctly, and scientifically one of the most important dental operations; and its object is to provide a simple and comparatively inexpensive apparatus or device for the purpose named having few parts and those such as are not liable to get out of order, easy of adjustment, that gives complete control of the movement of the jaw, and is regulated by scale; and it consists of the parts and combination of parts hereinafter described and claimed.

In the accompanying drawings, forming a part of this specification, Figure 1 is a side elevation or isometrical perspective of my improved bite-taker arranged in operative position, and Fig. 2 a perspective view of the device removed from the subject.

One of the most important operations in dentistry is that of taking a bite, for upon the manner in which the occlusion is made and the artificial dentures articulated depends entirely their fit, comfort, success, and usefulness to the patient. In many cases where there have been but a few teeth in the mouth nature in attempting to utilize them for masticating purposes has caused the jaw to list to one side or protrude unnaturally. The common and usual manner of determining the proper movement and distance between the two jaws and of ascertaining whether the lower jaw has been closed without protrusion or side motion is to conform a piece of softened wax to the mouth and place it between the gums for the patient to bite into; but as the natural tendency of the human jaw when biting upon any substance is toward an outer and sidewise motion it is almost impossible to get the patient to close the jaw together naturally without the motion mentioned and stopped in the desired position by the method above described, and the dentist often finds when he sets up the artificial dentures and articulates the artificial teeth according to the bite in the manner described that he has allowed the patient's lower jaw to protrued forward or sidewise in an unnatural position to such an extent as to cause an imperfect and inaccurate occlusion or articulation of the artificial denture and that the teeth failed to come together properly until the artificial denture has been completed and tried in the mouth, and it is then too late to rectify the mistake without making the entire denture over. Thus the failure is a costly one, causing loss of time and prestige, worry to the patient, and the expense of making and finishing other artificial dentures.

Now it is the purpose of my invention to obviate the difficulties and uncertainties attending the success of the operation described by forcing the patient mechanically to bite in a natural manner and to provide an apparatus that will enable the dentist to take the bite with absolute certainty as to the correctness thereof, all of which I accomplish by means of the apparatus or device hereinafter described.

Similar letters refer to similar parts in both the views.

Referring to the drawings, A represents the temple-pads, which are to be clamped to the head of the patient in order to firmly secure the apparatus in operative position. These pads are preferably made of metal and are lined with soft rubber $a$. The pads A are elongated in shape and at one end are formed or provided with bars B, which converge and the converging ends of which are pivotally secured to ears or lugs $b$, which project laterally from a threaded block or sleeve C, through which the screw D bears against the back of a human head and which is connected by lever-arms G to the arms B at a point near their junction with the pads, said lever-arms being pivotally connected to ears $f$ on the plate F, so that the rotation of the wheel E to the right will cause the screw to force the plate F inwardly and against the back of the head, and thus draw the adjacent ends of the levers inward, which movement causes the arms B to draw the temple-pads toward each other and to clamp the head between them.

H represents the brace-bars, the ends of which are rigidly secured to the temple-pads and extend forwardly and downwardly to a point approximately at the condyles of the jaw, where it is rigidly secured to the temple-shanks K, which are secured to and extend at right angles from the temple-pads. The shanks K extend downwardly from their point of connection with the brace-bars H and curve forwardly and downwardly past the side of the chin, and their ends are adjustably secured to the bit-bar L by means of set-screws m, whereby they may be readily slid along the bar toward or from each other to adjust them to narrow or wide faces. The chin-piece M is formed of metal in a shape to fit over a chin and is provided with a rubber lining or pad and is formed with arms N, which extend rearwardly and curve upwardly and forwardly to the point of connection of the shank and brace-bars, where it is hinged or pivotally secured. An upright support P is adjustably supported on the bit-bar between the ends of the temple-shanks K and carries a curved graduated or scale bar R, the upper end of which is bent over to form an index-pin S for indicating the center and lip lines. The chin-piece M is formed or provided with a yoke T, which embraces the graduated bar R, so that it may readily slide up and down on said bar in unison with the movement of the chin-piece as the jaw is moved. The upright P is adjustable longitudinal of the bit-bar, so as to adjust it to a position in line with the center of the mouth, and also around the bar or to any desired angle from the vertical on said bar, to adjust it to the proper position to force the jaw back into its natural position, and to prevent sidewise motion thereof while taking the bite, so that when the artificial denture articulated from this position is placed in the mouth it forces the patient to masticate in a natural manner and in a short time corrects the deformity caused from improper occlusion. The graduated bar is formed with a series of perforations, and the yoke is perforated so that a pin may be inserted therethrough and through any one of the perforations in the bar, thereby holding the yoke rigidly in position to secure accuracy, by scale, in raising or lowering the bite.

Having thus described my invention, what I claim as new, and desire to secure by Letters Patent, is—

1. A dental bite-taking device comprising temple-pads, means for clamping the said pads in position, a chin-piece pivotally supported from said temple-pads, an adjustable graduated bar and lip-line indicator, and means connecting said bar and chin-piece whereby the movements of the latter will be accurately noted on the bar.

2. A dental bite-taking device comprising temple-pads adapted to clamp the head of a patient, a bit-bar supported from said temple-pads, a graduated bar and lip-line indicator adjustably supported by said bit-bar, and a yoke connected to said chin-piece and slidable on said graduated bar to mark movements of the chin-piece.

3. A dental bite-taking device comprising temple-pads, a block or sleeve pivotally connecting said pads, a back plate pivotally connected to said temple-pads, a screw engaging said back plate for clamping said temple-pads to the head, a chin-piece pivotally supported from said pads, a graduated bar and lip-line indicator, and means carried by said chin-piece for indicating its movements on said graduated bar.

4. A dental bite-taking device comprising temple-pads adapted to be clamped to the head, a bit-bar, temple-shanks carried by said pads and adjustably attached to said bit-bar, a graduated bar and lip-line indicator adjustably attached to said bit-bar, a hinged chin-piece, and a yoke carried by said chin-piece for indicating its movements on the graduated bar.

5. A dental appliance comprising temple-pads, means for clamping said pads in position, a chin-piece pivotally supported from said temple-pads, a stationary bit-bar, an upright adjustably secured to said bit-bar, and means for slidably connecting said upright and chin-piece, whereby the movement of the latter may be restricted to any desired arc.

In testimony whereof I affix my signature in presence of two witnesses.

LYTER H. CRAWFORD.

Witnesses:
 ANNA MEYERS,
 GEO. A. RUSSELL.